US 12,531,808 B2

United States Patent
Ilany et al.

(10) Patent No.: US 12,531,808 B2
(45) Date of Patent: Jan. 20, 2026

(54) TRANSPORT PROTOCOL SELECTION BASED ON CONNECTION STATE

(71) Applicant: Amazon Technologies, Inc., Seattle, WA (US)

(72) Inventors: Omer Ilany, Superior, CO (US); Georgy Zorik Machulsky, San Jose, CA (US); Arjun Hary, San Jose, CA (US); Ori Golan, Cedar Park, TX (US); Netanel Belgazal, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 748 days.

(21) Appl. No.: 17/809,872

(22) Filed: Jun. 29, 2022

(65) Prior Publication Data

US 2024/0007405 A1 Jan. 4, 2024

(51) Int. Cl.
*H04L 47/19* (2022.01)
*H04L 43/0811* (2022.01)
*H04L 45/745* (2022.01)

(52) U.S. Cl.
CPC ........ *H04L 47/196* (2013.01); *H04L 43/0811* (2013.01); *H04L 45/745* (2013.01); *H04L 2212/00* (2013.01)

(58) Field of Classification Search
CPC . H04L 43/0811; H04L 45/745; H04L 2212/00
See application file for complete search history.

(56) References Cited

U.S. PATENT DOCUMENTS

| | | | |
|---|---|---|---|
| 5,699,500 | A | 12/1997 | Dasgupta |
| 6,788,686 | B1 | 9/2004 | Khotimsky et al. |
| 6,990,528 | B1 | 1/2006 | Neal et al. |
| 7,088,718 | B1 | 8/2006 | Srivastava |
| 7,171,484 | B1 | 1/2007 | Krause et al. |
| 7,293,107 | B1 | 11/2007 | Hanson et al. |
| 7,912,064 | B2 | 3/2011 | Elzur |
| 7,913,077 | B2 | 3/2011 | Ko et al. |

(Continued)

FOREIGN PATENT DOCUMENTS

| | | |
|---|---|---|
| CN | 1625179 A | 6/2005 |
| CN | 101848203 A | 9/2010 |

(Continued)

OTHER PUBLICATIONS

International Search Report and Written Opinion dated Sep. 28, 2023, in Application No. PCT/US2023/068802.

(Continued)

*Primary Examiner* — Christopher M Crutchfield
*Assistant Examiner* — Tito Q Pham
(74) *Attorney, Agent, or Firm* — Weaver Austin Villeneuve & Sampson LLP

(57) ABSTRACT

A network interface adapter can select between a first transport protocol and a second transport protocol to transmit a network packet based on a state of a connection to a destination address for the second transport protocol. The second transport protocol encapsulates the network packet formatted in the first transport protocol. The network interface adapter can automatically use the second transport protocol when the state of the connection is in an active state, and the first transport protocol when the state of the connection is not in the active state.

20 Claims, 9 Drawing Sheets

(56) References Cited

U.S. PATENT DOCUMENTS

| | | | |
|---|---|---|---|
| 8,031,729 B2 | 10/2011 | Elzur | |
| 8,190,960 B1 | 5/2012 | Bahadur et al. | |
| 9,654,385 B2 | 5/2017 | Chu et al. | |
| 9,667,723 B2 | 5/2017 | Pandya | |
| 9,747,249 B2 | 8/2017 | Cherian et al. | |
| 9,985,903 B2 | 5/2018 | Shalev et al. | |
| 9,985,904 B2 | 5/2018 | Shalev et al. | |
| 10,148,570 B2 | 12/2018 | Shalev et al. | |
| 10,375,167 B2 | 8/2019 | Shamis et al. | |
| 10,430,373 B2 | 10/2019 | Cherian et al. | |
| 10,498,654 B2 | 12/2019 | Shalev et al. | |
| 10,645,019 B2 | 5/2020 | Shalev et al. | |
| 10,673,772 B2 | 6/2020 | Shalev et al. | |
| 10,917,344 B2 | 2/2021 | Shalev et al. | |
| 2002/0198927 A1 | 12/2002 | Craddock et al. | |
| 2003/0031183 A1 | 2/2003 | Kashyap et al. | |
| 2003/0035433 A1 | 2/2003 | Craddock et al. | |
| 2003/0053457 A1 | 3/2003 | Fox et al. | |
| 2004/0003126 A1 | 1/2004 | Boucher et al. | |
| 2004/0042458 A1 | 3/2004 | Elzu | |
| 2004/0042483 A1 | 3/2004 | Elzur et al. | |
| 2004/0044796 A1 | 3/2004 | Vangal et al. | |
| 2004/0049612 A1 | 3/2004 | Boyd et al. | |
| 2004/0049774 A1 | 3/2004 | Boyd et al. | |
| 2004/0190516 A1 | 9/2004 | Williams | |
| 2005/0060442 A1 | 3/2005 | Beverly et al. | |
| 2005/0144310 A1 | 6/2005 | Biran et al. | |
| 2005/0180327 A1 | 8/2005 | Banerjee et al. | |
| 2006/0007935 A1 | 1/2006 | Bennett et al. | |
| 2006/0075067 A1 | 4/2006 | Blackmore et al. | |
| 2006/0101090 A1 | 5/2006 | Aloni et al. | |
| 2006/0101225 A1 | 5/2006 | Aloni et al. | |
| 2006/0168274 A1 | 7/2006 | Aloni et al. | |
| 2007/0140159 A1* | 6/2007 | Eronen | H04L 69/165 370/328 |
| 2007/0208820 A1 | 9/2007 | Makhervaks et al. | |
| 2008/0043750 A1 | 2/2008 | Keels et al. | |
| 2009/0106771 A1 | 4/2009 | Benner et al. | |
| 2009/0219939 A1 | 9/2009 | Isosaari | |
| 2009/0222564 A1 | 9/2009 | Freimuth et al. | |
| 2011/0013605 A1 | 1/2011 | Moeller | |
| 2011/0280247 A1 | 11/2011 | Roskind | |
| 2012/0023304 A1 | 1/2012 | Chan et al. | |
| 2012/0089694 A1 | 4/2012 | Pandya | |
| 2012/0155458 A1 | 6/2012 | Larson et al. | |
| 2012/0155468 A1 | 6/2012 | Greenberg et al. | |
| 2012/0265837 A1 | 10/2012 | Grant et al. | |
| 2012/0281714 A1 | 11/2012 | Chang et al. | |
| 2012/0287944 A1 | 11/2012 | Pandit et al. | |
| 2013/0022033 A1* | 1/2013 | Shi | H04W 76/12 370/338 |
| 2013/0051222 A1 | 2/2013 | Gavrilov et al. | |
| 2013/0080561 A1 | 3/2013 | Fox et al. | |
| 2013/0114606 A1 | 5/2013 | Schrum, Jr. et al. | |
| 2013/0145035 A1 | 6/2013 | Pope et al. | |
| 2013/0268980 A1 | 10/2013 | Russell | |
| 2013/0304796 A1 | 11/2013 | Jackowski et al. | |
| 2014/0052808 A1 | 2/2014 | Krishnan et al. | |
| 2014/0153572 A1 | 6/2014 | Hampel et al. | |
| 2014/0310369 A1 | 10/2014 | Makhervaks et al. | |
| 2014/0358972 A1 | 12/2014 | Guarrieri et al. | |
| 2015/0010090 A1 | 1/2015 | Sugimoto | |
| 2015/0052280 A1 | 2/2015 | Lawson | |
| 2015/0124652 A1 | 5/2015 | Dharmapurikar et al. | |
| 2015/0127797 A1 | 5/2015 | Attar et al. | |
| 2015/0163144 A1 | 6/2015 | Koponen et al. | |
| 2015/0172226 A1 | 6/2015 | Borshteen et al. | |
| 2015/0179227 A1 | 6/2015 | Russell | |
| 2015/0263932 A1 | 9/2015 | Chunduri et al. | |
| 2015/0373165 A1 | 12/2015 | Anand et al. | |
| 2016/0026604 A1 | 1/2016 | Pandit et al. | |
| 2016/0094356 A1 | 3/2016 | Xiang et al. | |
| 2016/0212214 A1 | 7/2016 | Rahman et al. | |
| 2016/0226755 A1 | 8/2016 | Hammam et al. | |
| 2016/0234127 A1 | 8/2016 | Agarwal et al. | |
| 2016/0344633 A1 | 11/2016 | Jiao et al. | |
| 2017/0006142 A1 | 1/2017 | Kwon | |
| 2017/0134535 A1 | 5/2017 | Osamura et al. | |
| 2017/0187496 A1 | 6/2017 | Shalev et al. | |
| 2017/0187621 A1 | 6/2017 | Shalev et al. | |
| 2017/0187629 A1* | 6/2017 | Shalev | H04L 43/0852 |
| 2017/0187846 A1 | 6/2017 | Shalev et al. | |
| 2017/0195240 A1 | 7/2017 | Chen et al. | |
| 2017/0223154 A1 | 8/2017 | Hammam et al. | |
| 2017/0346742 A1 | 11/2017 | Shahar et al. | |
| 2018/0004705 A1 | 1/2018 | Menachem et al. | |
| 2018/0219980 A1 | 8/2018 | McCulley et al. | |
| 2019/0363989 A1 | 11/2019 | Shalev et al. | |
| 2020/0128112 A1* | 4/2020 | Li | H04L 69/22 |
| 2020/0259759 A1 | 8/2020 | Shalev et al. | |
| 2021/0119930 A1 | 4/2021 | Debbage et al. | |
| 2021/0344714 A1* | 11/2021 | Yang | H04L 61/103 |
| 2021/0385155 A1* | 12/2021 | Suryanarayana | H04L 45/64 |
| 2023/0300223 A1* | 9/2023 | Pham | H04L 69/16 709/224 |

FOREIGN PATENT DOCUMENTS

| | | |
|---|---|---|
| CN | 103929492 A | 7/2014 |
| CN | 103986647 A | 8/2014 |
| CN | 104541257 A | 4/2015 |
| CN | 104620664 A | 5/2015 |
| JP | 2002305535 A | 10/2002 |
| JP | 2004531175 A | 10/2004 |
| JP | 2005524264 A | 8/2005 |
| JP | 2008507201 A | 3/2008 |
| JP | 2015050746 A | 3/2015 |
| WO | WO-2013169073 A1 | 11/2013 |

OTHER PUBLICATIONS

Bryant, S. et al., "Pseudowire Emulation Edge-to-Edge (PWE3) Control Word for Use over an MPLS PSN", XP015044817, Feb. 1, 2006, 12 pages.

"LibFabrics: Open Fabrics", OpenFabrics Interfaces Working Group, Accessed from Internet on Jan. 9, 2017, 6 pages. URL: https://ofiwg.github.io/libfabric/.

"Open Fabrics Software", OFED Overview. Open Fabrics Alliance, Sep. 7, 2015, 2 pages. URL: https://www.openfabrics.org/index.php/openfabrics-software.html.

Russell, R.D., "Introduction to RDMA Programming", University of New Hampshire InterOperability Laboratory, 2012, 76 pages. URL: http://www.cs.unh.edu/-rdr/rdma-intro-module.ppt.

U.S. Appl. No. 16/712,589, inventors Shalev et al., filed on Dec. 12, 2019.

\* cited by examiner

TRANSPORT PROTOCOL SELECTION BASED ON CONNECTION STATE

BACKGROUND

Computing networks can be implemented as packet-switched networks that include devices such as servers that manage workloads and respond to client requests, switches that connect devices together, routers that perform packet forwarding functions, etc. The devices may communicate over a local area network (LAN) using transport protocols such as Transmission Control Protocol (TCP) and User Datagram Protocol (UDP). TCP is a connection-oriented protocol at the transport layer of the protocol stack that provides reliable delivery of packets. UDP uses a simple connectionless communication model with a minimum of protocol mechanisms, and may provide faster communication speeds than TCP without packet delivery reliability.

BRIEF DESCRIPTION OF THE DRAWINGS

Various embodiments in accordance with the present disclosure will be described with reference to the drawings, in which.

DETAILED DESCRIPTION

Figure 1:
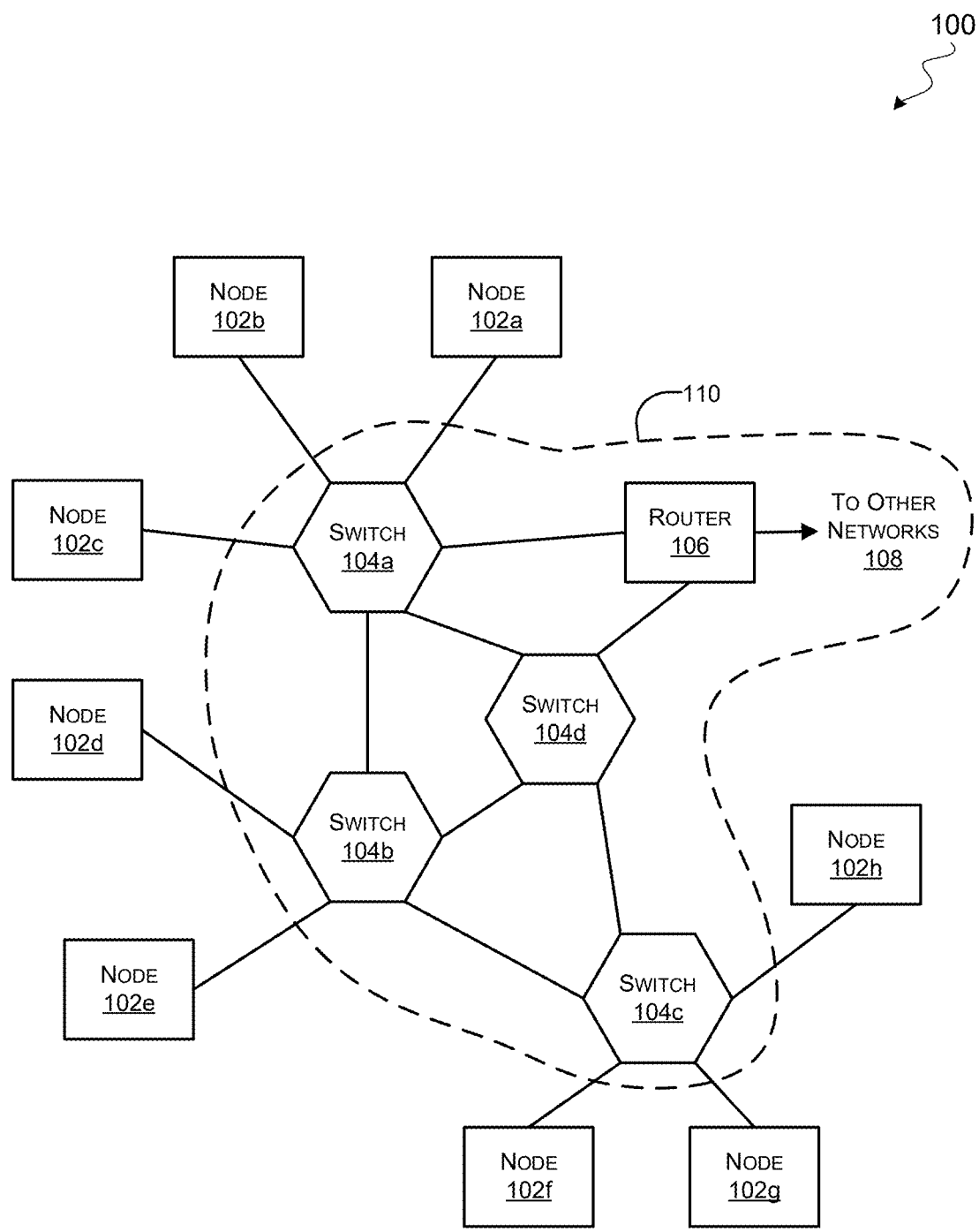
FIG. 1 is a diagram illustrating an example of a group of computing resources connected via a network.

To improve upon network behavior in a congested network for applications that use standard transport protocols such as TCP and UDP, an enhanced transport protocol can be implemented to provide a more uniform distribution of traffic and reduce latency variance. The enhanced transport protocol can be implemented to encapsulate the standard transport protocol packets. As such, the enhanced transport protocol can be implemented in components that support both the standard transport protocols and the enhanced transport protocol to provide interoperability between the protocols.

The enhanced transport protocol can be used for transmission of packets between the endpoints when the enhanced transport protocol connection is enabled and is in an active state. However, in some instances, even after the enhanced transport protocol connection has been established and is being used for packet transmission, the connection can be interrupted. For example, the destination may stop responding to the enhanced transport protocol packets transmitted by the source, the destination application may disable the use of the enhanced transport protocol, or the connection may reset due to some reason. This interruption in the enhanced transport protocol connection may adversely impact system performance causing packet loss and/or network downtime during re-establishment of the connection.

The techniques described herein can be used to allow transmission of packets using a default transport protocol (e.g., TCP or UDP) when the enhanced transport protocol connection is not active or cannot be used. For example, a source may determine that the enhanced transport protocol connection with the destination is no longer responding for a certain timeout period. In such cases, the source may select the default transport protocol to continue transmitting the packets to the destination while the enhanced transport protocol connection is being re-established.

At a later point in time, the source may re-establish the enhanced transport protocol connection with the destination. If the attempt to re-establish the enhanced transport protocol connection succeeds, the source may select the enhanced transport protocol for packet transmission again. In some implementations, the source and destination applications may not even be aware of the transition. However, if the enhanced transport protocol connection cannot be re-established for some reason, or while the enhanced transport protocol connection is being re-established, the source may fall back to using the default transport protocol to transmit the packets. Thus, the various embodiments can be used to automatically select between transport protocols for transmitting packets based on the state of a connection between a source device and a destination device to improve reliability and performance.

In the description herein, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 is a diagram illustrating an example of a group of computing resources 100 connected via a network 110. The group of computing resources 100 may be connected with switches, and in some implementations may be configured to run in parallel. In some implementations, the various computing resources may form a single logical computing resource. The example group of computing resources 100 illustrated in FIG. 1 may include multiple nodes 102a-h and switches 104a-d. In some implementations, the group of computing resources may also include a router 106.

The nodes 102a-h illustrated in FIG. 1 may represent various computing resources. For example, one or more nodes 102a-h may be a computer, such as a server computer. The computers may include one or more processors, and these processors may include one or more processing cores. These computers may also include memory and peripheral devices. In some implementations, these computers may use an adapter device to connect to a switch 104a-d in the group of computing resources 100. Other examples of computing resources include storage devices (e.g., hard drives), storage subsystems (e.g., an array of storage devices), Input/Output (I/O) modules, and consoles for administration access to the group of computing resources 100.

The switches 104a-d may provide connectivity between the various nodes 102a-h. Each node 102a-h may be connected to the group of computing resources 100 through a connection with a switch 104a-d. In some cases, a node 102a-h may be connected to more than one switch 104a-d. Switches may also be connected to other switches. In most cases, any port on a switch 104a-d may be used to connect to either a node 102a-h or another switch. In most implementations, the size of the group of computing resources 100 can quickly and easily be expanded by connecting more switches and nodes.

The switches 104a-d may provide multiple paths from any node 102a-h to any other node 102a-h. A switch 104a-d may have multiple connections with another switch 104a-d, which provides additional paths between the switches 104a-d. In some cases, the nodes 102a-h may be connected to more than one switch 104a-d, also creating more paths. Packets from one node 102a-h may use multiple paths at the same time to reach another node 102a-h. Alternatively or additionally, packets from one node 102a-h to another node 102a-h may follow only one path. In some cases, at each switch 104a-d a decision may be made as to which path a packet will follow. In other cases, a packet's path may be determined in advance, typically at the source node. A stream of packets from one node 102a-h to another node 102a-h may be referred to as a packet flow, or simply as a "flow." In some cases, the packets in a flow are related, such as for example when the packets together form one message.

In some implementations, the group of computing resources 100 may be connected to a router 106. The router 106 may provide a connection to other networks 108, such as other networks or sub-networks (subnets), or Local Area Networks (LANs). The interconnected switches 104a-d (and the router 106, if present) may be referred to as a switch fabric, fabric, or network 110. Herein, the terms "fabric" and "network" may be used interchangeably. The protocol used for communication between the nodes should provide high bandwidth and low latency. High bandwidth means that a large volume of traffic should be able to traverse the network, and low latency means that the traffic should be able to travel from source to destination as quickly as possible.

In some implementations, the individual computing resources may work cooperatively to solve a large problem that one computer may not be able to solve alone, or may take a very long time to solve alone. In some cases, a computing cluster may provide performance similar to a super computer but for less cost and with less complexity. The switched fabric architecture used by a computing cluster may also have the advantage of being fault tolerant and scalable. Multiple paths between the nodes may also keep aggregate bandwidth high, and provide redundant connections in case of link failures.

Transmission Control Protocol (TCP) is a connection-oriented protocol that provides host-to-host connectivity at the transport layer of the protocol stack. Part of the function of establishing a connection is creating the mechanism to track data that has been sent and acknowledge what is received. Each byte of data sent in a TCP connection has an associated sequence number indicated on the sequence number field of the TCP header. When the receiving socket detects an incoming segment of data, it uses the sequence number in the TCP header to acknowledge receipt. After sending a packet of data, the sender will start a retransmission timer of certain duration. If it does not receive an acknowledgment before the timer expires, the sender will assume the segment has been lost and will retransmit it.

However, TCP is optimized for accurate delivery rather than timely delivery and can incur relatively long delays (on the order of seconds) while waiting for out-of-order packets or re-transmissions of lost packets. For example, TCP may suffer from packet latency outliers (tail latency) due to failures in the underlying physical network and limitations on bandwidth on the single connection imposed to ensure different flows by different users do not interfere with each other and do not cause a noisy neighbor effect on the switches and physical network.

User Datagram Protocol (UDP) uses a simple connectionless communication model with a minimum of protocol mechanisms, using checksums for data integrity and port numbers for addressing different functions at the source and destination of the datagram. UDP provides no handshaking dialogues, and thus exposes applications to any unreliability of the underlying network; there is no guarantee of packet delivery, ordering, or duplicate protection. UDP is thus an unreliable protocol.

In some implementations, networks may include devices such as servers that manage workloads and respond to client requests, switches that connect devices together; routers that perform packet forwarding functions; etc. The devices may communicate over packet-switched Ethernet LANs using TCP or UDP. A network adapter, for example, Elastic Network Adapter (ENA), may be used by applications for networking. ENA may expose an Ethernet network device interface to the host system. The network interface for ENA sends packets over an equal cost multi-path (ECMP) to a destination ENA network interface. Each switch will typically choose the same port for the packets on the same application flow, and the packets will follow the same path unless some event happens, for example, a switch failure. In cases of such an event, the routing will eventually be changed and a different path for the packets will be chosen. However, choosing a new path may take a long time. Thus, a given packet flow that was using the failed flow device will not be able to pass any traffic from source to destination until the problem is resolved.

Figure 2:
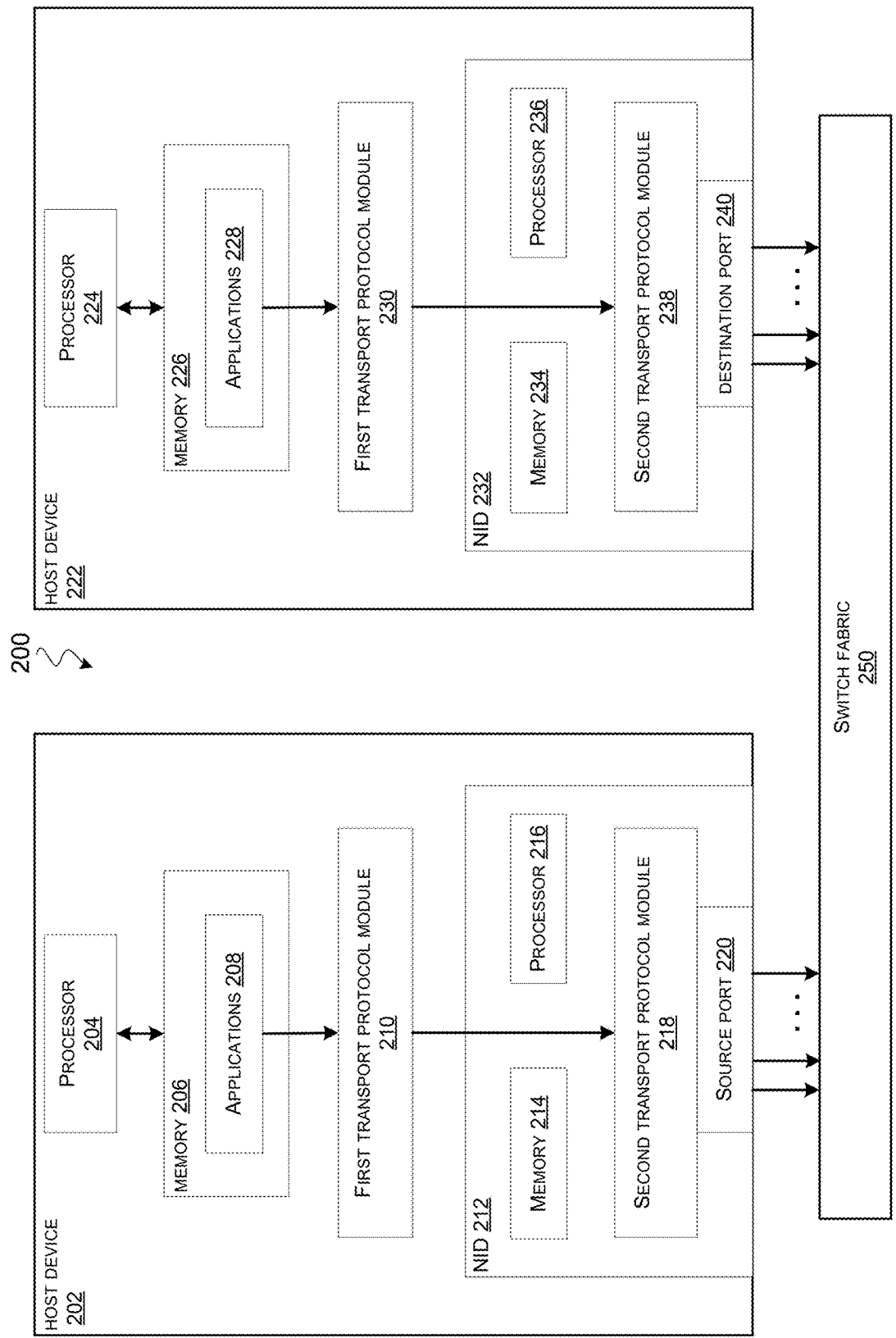
FIG. 2 is a diagram illustrating an example of a computer system having a network interface device.

FIG. 2 is a diagram illustrating an example of a computer system having a network interface device. Referring to FIG. 2, a host computing device 202, 222 may be, for example, a computer system, a server, or other network connected device. A host computing device 202, 222, may act as a source device that generates packets to be transmitted over a network and/or a destination device that receives packets generated by a source device. Any network connected device may act as a source device or a destination device at various times. In the example of FIG. 2, the host computing device 202 may act as a source network device and the host computing device 222 may act as a destination network device during certain operations. The host computing device 202 or the host computing device 222 can be one of the nodes from the nodes 102a-102h in FIG. 1.

The source host device 202 may include a processor 204, a memory 206, and a source network interface device (NID) 212, also referred to herein as a network interface adapter. The source NID 212 may include a processor 216 and a memory 214. The source host device 202 may implement a first source transport protocol module 210. The first source transport protocol module 210 may expose an interface associated with the first transport protocol to the applications 208 executing on the source host device 202. The first source transport protocol module 210 may format data received from applications executing on the source host device 202 into first packets according to a first transport protocol. The source NID 212 may implement a second source transport protocol module 218 to format the first packets into second packets for transmission over the network according to a second transport protocol. The second transport protocol may add sequence numbers to the second packets. The source NID 212 may include source ports 220 configured to interface with a switch fabric 250, also referred to as the network 250. The first transport protocol may be, for example, the TCP transport protocol, the UDP transport protocol, or another transport layer protocol, and the second transport protocol may be an enhanced transport protocol or another transport layer protocol.

The enhanced transport protocol can be, for example, a Scalable Reliable Datagram (SRD) transport protocol (sometimes referred to as a Relaxed Reliable Datagram (RRD) transport protocol), and can provide one or more enhanced features such as any of reduced latency, quick recovery from network path faults, and/or detection and retransmission of lost packets faster than TCP, in most cases before TCP detects a packet is missing. While various embodiments may be described with respect to TCP/UDP and SRD transport layer protocols, other transport layer protocols (e.g., protocols operating at the transport layer or layer 4 of the Open Systems Interconnection (OSI) model) may be implemented by the first and second protocol modules without departing from the scope of the present disclosure.

The enhanced transport protocol (e.g., SRD) may enable the use of multiple paths to send packets of the same user flow in parallel over the network. Using multiple paths in parallel enables the spreading of packets of a given flow onto different paths to reduce overall latency and improve reliability. Thus, if problems are seen (e.g., congestion on a particular path), paths can be quickly switched and the packets may be retransmitted over a different path. Recovery from failed network equipment can happen quickly and does not depend on routing changes.

The underlying enhanced transport protocol can process retransmission requests for dropped packets before the actual TCP mechanism detects that a packet is missing. For example, with TCP, when a packet is dropped on a network switch, TCP can detect the missing packet using a timeout mechanism (e.g., using a timer in a range of 50 ms), while enhanced transport protocol is able to detect and retransmit missing packets in less than one millisecond. Thus, before TCP will detect a retransmission timeout, enhanced transport protocol may detect the timeout and cause a packet retransmission. The packet may be retransmitted on a different path. Even with multiple retransmissions, enhanced transport protocol can retransmit and deliver the packet to the destination before TCP detects that the packet is lost. From the TCP perspective, the packet is delivered with no knowledge that the packet was actually retransmitted by the enhanced transport protocol.

In some implementations, the first transport protocol module may be implemented in a host device and the second transport protocol module may be implemented in a network interface device. In these implementations, the first transport protocol module may be implemented as a software module, and the second transport protocol module may be implemented in hardware (e.g., circuitry) or software or a combination of hardware and software. In other implementations, the first transport protocol module and the second transport protocol module may be implemented in a host device. In these implementations, the first transport protocol module and the second transport protocol module may be implemented as software modules. In still other implementations, the first transport protocol module and the second transport protocol module may be implemented in a network interface device. In these implementations, the first transport protocol module and the second transport protocol module may be implemented in hardware (e.g., circuitry) or software or a combination of hardware and software. While examples described in the present disclosure may be explained in terms of a first transport protocol module implemented on a host device and a second transport protocol module implemented on a network interface device, it should be appreciated that the disclosed aspects apply to other configurations such as, but not limited to, the implementations described above.

Similarly, the destination host device 222 may include a processor 224, a memory 226, and a destination NID 232. The destination NID 232 may include a processor 236 and a memory 234. The destination host device 222 may implement a first destination transport protocol module 230. The first destination transport protocol module 230 may expose an interface associated with the first transport protocol to the applications 228 executing on the destination host device 222. The destination NID 232 may implement a second destination transport protocol module 238. The destination NID 212 may include destination ports 240.

Second packets transmitted over the network 250 by the source host device 202 may be received by the second destination transport protocol module 238 of the destination host device 222 via the destination ports 240. The second destination transport protocol module 238 may reorder the received second packets based at least in part on, for example, additional sequence numbers, remove the second transport protocol formatting, and pass the reordered packets to the first destination transport protocol module 230 as first packets. Additionally, the second destination transport protocol module 238 may communicate with the second transport protocol module 218 of the source host device 202 for retransmission of second packets that are corrupted or dropped by the network 250.

The first destination transport protocol module 230 may receive the first packets from the second destination transport protocol module 238 and remove the first transport protocol formatting to acquire the data from the first packets. The first destination transport protocol module 230 may pass the acquired data to applications executing on the destination host device 222 via an interface associated with the first transport protocol exposed to the applications 228 executing on the destination host device 222. When a source application 208 executing on the source host device 202 has data to be sent to a destination application 228 executing on the destination host device 222, the source application 208 may pass the data to the first source transport protocol module 210 via the interface exposed to the source application 208.

The first source transport protocol module 210 may encapsulate the data into first network packets according to the first transport protocol. For example, the first source transport protocol module 210 may format the data into a packet payload and add packet header information to the first packets according to the first transport protocol. The first source transport protocol module 210 may pass the first network packets to the second source transport protocol module 218.

The second source transport protocol module 218 may add additional header information to encapsulate the first network packets according to the second transport protocol. For example, the second source transport protocol module 218 may add more header information to each first network packet including a flow identification (flow ID) and sequence numbers according to the second transport protocol.

Figure 3:
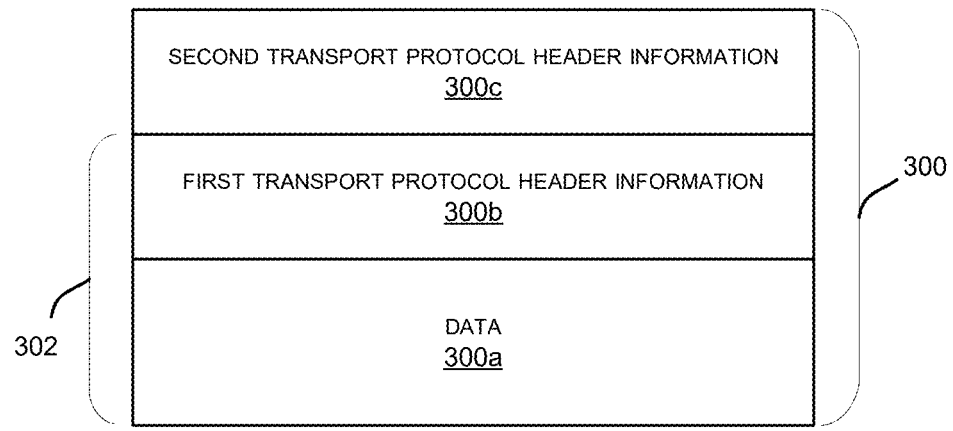
FIG. 3 is a diagram illustrating an encapsulated network packet.

FIG. 3 is a diagram illustrating an encapsulated network packet. Referring to FIG. 3, data 300a from an application may be formatted (e.g., encapsulated) into a first network packet 302 according to the first transport protocol. For example, the data may be encapsulated into a network packet by adding first transport protocol header information 300b to form the first network packet 302. The first network packet 302 may then be encapsulated according to the second transport protocol to generate the second network packet 300. For example, the first network packet 302 may be encapsulated into a second network packet by adding second network transport protocol header information 300c to form the second network packet 300. The second transport protocol header information 300c may include a sequence number and a flow identifier. From the perspective of the application, the data may appear as being sent via a typical Ethernet device. In other words, the source application 208 may be unaware that the packets are encapsulated according to the second transport protocol when being transmitted to the destination.

In some implementations, the first transport protocol may be TCP or UDP and the second transport protocol may be an enhanced transport protocol such as SRD. In such implementations, TCP or UDP packets can be passed from the first source transport protocol (e.g., TCP or UDP) module to the second source transport protocol (e.g., SRD) module. The second source transport protocol module may encapsulate the TCP or UDP packet according to the enhanced transport protocol, including an enhanced transport protocol sequence number, and may assign a network path for each packet independent of the application flow to which the packet belongs.

Returning to FIG. 2, the source NID 212 may cause the enhanced transport protocol packets of the same application flow to be distributed over different paths across the network (e.g., switch fabric 250). Spreading the traffic across multiple paths is handled by the enhanced transport protocol, and may include header modifications to enforce various routing or forwarding decisions for different packets. For example, various distribution algorithms (e.g., round-robin, equal-cost multipath (ECMP), random packet spring (RPS), etc.) may be used to distribute the enhanced transport protocol packets between the source ports 220 to maintain reliable transmission and delivery of the enhanced transport protocol packets to the destination. The enhanced transport protocol may establish connections between source ports 220 and destination ports 240.

The enhanced transport protocol can be used for transmission of packets between the host device 202 and the host device 222 when the enhanced transport protocol connection is enabled and is in an active state. However, in some instances, even after the enhanced transport protocol connection has been established and being used for transmitting the packets from the source host device 202 to the destination host device 222, the destination NID 232 may stop responding to the enhanced transport protocol packets transmitted by the source NID 212. For example, the enhanced transport protocol connection may be dropped by the destination NID 212, the destination application 228 may disable the use of the enhanced transport protocol, or the enhanced transport protocol connection may be reset for some reason.

The techniques described herein can be used to allow transmission of packets through the switch fabric 250 using the second transport protocol when the enhanced transport protocol connection is in an active state, and using the first transport protocol when the enhanced transport protocol connection is not in the active state or cannot be used. For example, the NID 212 may determine that the enhanced transport protocol connection with the NID 232 is no longer responding over a certain timeout period. In such cases, the NID 212 may select the first transport protocol to continue transmitting the packets to the NID 232 without dropping the connection to the network.

At a later point in time, the NID 212 may communicate with the NID 232 to re-establish the enhanced transport protocol connection through the switch fabric 250 (or vice versa). If the attempt to re-establish the enhanced transport protocol connection succeeds, the NID 212 may select the enhanced transport protocol to transmit the packets, without losing the network connection, or the application 208 and/or the application 228 being aware of the transition. However, if the enhanced transport protocol connection cannot be re-established for some reason, or while the enhanced transport protocol connection is still being established/re-established, the NID 212 may fall back to using the first transport protocol to transmit the packets. Thus, the embodiments can be used to automatically select between the transport protocols for transmitting packets based on a state of a connection between a source device and a destination device to improve reliability and performance.

Figure 4:
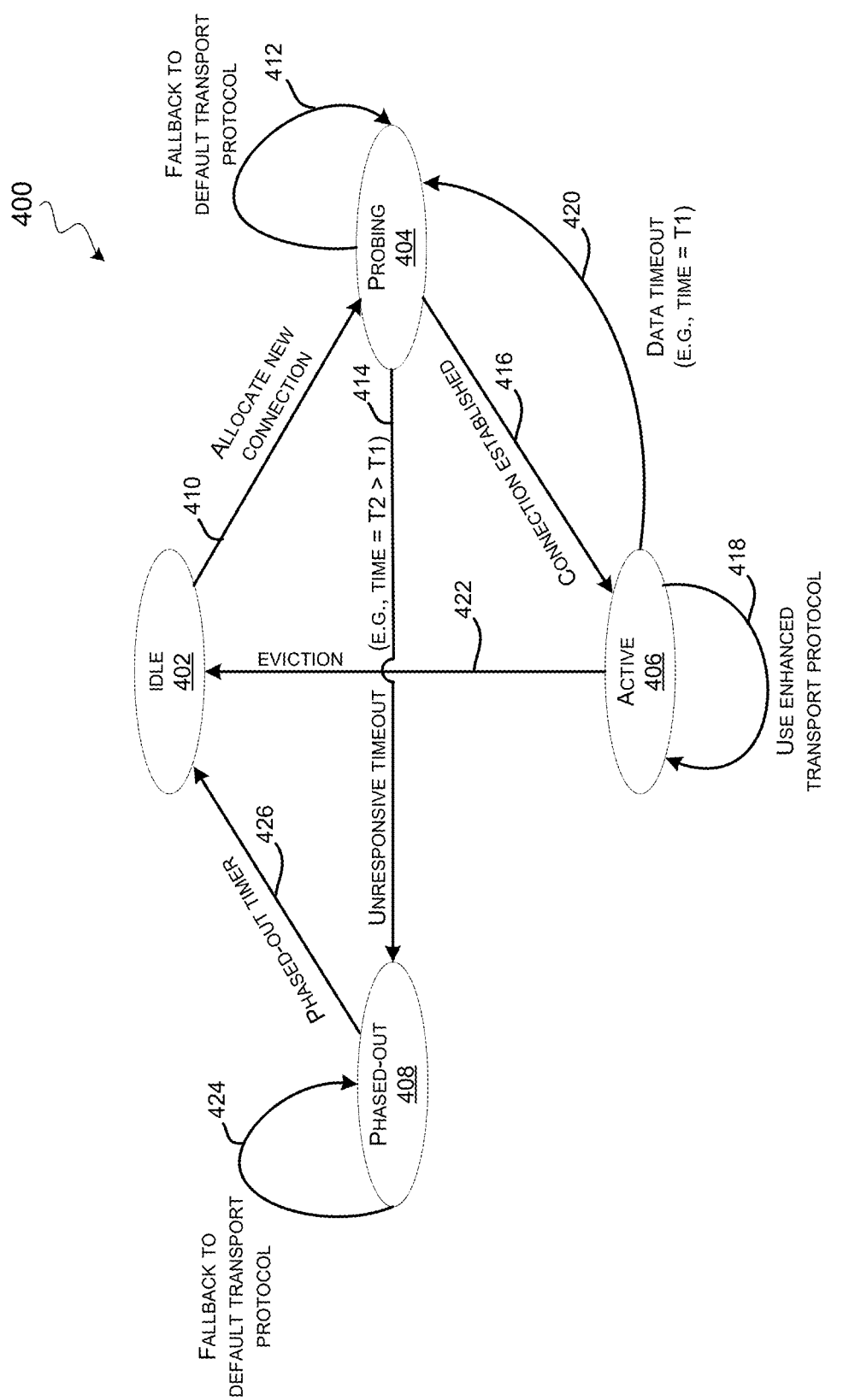
FIG. 4 illustrates a state machine that indicates various states of a Scalable Reliable Datagram (SRD) connection, according to some embodiments.

FIG. 4 illustrates a state machine 400 that controls the various states of an enhanced transport protocol connection, according to some embodiments. As an example, the state machine 400 can be implemented in the processing logic of an NID. The NID can be the source NID 212 of a local node that is operable to transmit packets to the destination NID 232 of a remote node from the nodes 102a-102h in FIG. 1. The destination NID 232 may also implement a similar state machine 400.

In an idle state 402, the enhanced transport protocol connection may be closed since the NID may not have started communicating with any of the remote nodes yet (or the enhanced transport protocol connection has been evicted or otherwise has not been re-established after a duration of time). The idle state 402 may also be called an initial state, a default state, or a closed state. When the NID receives an egress packet (e.g., from a host) for transmitting to a destination address, the NID can allocate a new connection (e.g., indicated by an action 410) to that destination address and transition to a probing state to start establishing an enhanced transport protocol connection (e.g., an SRD connection) with the destination address. As an example, the destination address can be associated with the destination NID 232. The destination address may include an Internet Protocol (IP) address, or another type of network address that can be used to identify a device on the network.

In some embodiments, the NID may maintain an address table in an internal memory, which can comprise entries to store information associated with an enhanced transport protocol connection corresponding to each destination address for the NID. The information may include a state of the enhanced transport protocol connection for a corresponding destination address and metadata (e.g., a flow identifier and/or other connection information) associated with the enhanced transport protocol connection. When a new connection is allocated to a destination address, the destination address can be added to the address table along with information associated with the corresponding enhanced transport protocol connection. If an existing connection is evicted or closed, the corresponding entry can be removed or deleted from the address table.

In a probing state 404, the NID can communicate with the remote node to determine whether the enhanced transport protocol connection can be established with the destination address. While the state machine 400 is in the probing state

404, the NID can fall back to using the default transport protocol (e.g., TCP or UDP) for transmitting the egress packets to the destination address. For example, for each egress packet, a corresponding network packet 302 can be transmitted according to a default transport protocol. This may continue until the enhanced transport protocol connection is established. To establish the enhanced transport protocol connection, the NID may execute a handshaking process with the remote node. The handshaking process may include exchanging packets with the remote node to initiate the enhanced transport protocol connection. In some implementations, the handshaking process can be a multi-stage handshake involving multiple series of back-and-forth packets.

The state machine 400 can transition from the probing state 404 to an active state 406 once the enhanced transport protocol connection is established as a result of executing a successful handshake in the probing state 404 (e.g., indicated by an action 416). In the active state 406, the NID can select the enhanced transport protocol connection to the destination address and continue to transmit the egress packets according to the enhanced transport protocol while the enhanced transport protocol connection to this destination address is in the active state (e.g., indicated by an action 418). Transmitting an egress packet according to the enhanced transport protocol may involve encapsulating a packet formatted according to the default transport protocol with an enhanced transport protocol header.

In some instances, the enhanced transport protocol connection may become disconnected, disabled, or the destination address may stop responding to the NID. In some embodiments, the NID may determine that the destination address has become unresponsive to the enhanced transport protocol packets (e.g., no data packet acknowledgement received) over a certain data timeout period T1. In such cases, the state machine 400 may transition back to the probing state 404 to attempt to re-establish the enhanced transport protocol connection again with the destination address (e.g., indicated by an action 420).

In some implementations, the NID may support a finite number of enhanced transport protocol connections. When all the connections are in the active state, and a request to send a packet to a new destination is received, the processing logic of the NID may evict an active enhanced transport protocol connection to make room for the new connection. The active connection selected for eviction can be based on, for example, a least-recently-used algorithm. To evict a connection, the NID may close the enhanced transport protocol connection to the destination address, and the state machine 400 may transition the connection from the active state 406 to the idle state 402 (e.g., indicated by an action 422). In some embodiments, closing the enhanced transport protocol connection to a destination address may include deleting the entry corresponding to the destination address from the address table.

Referring back to the probing state 404, during the probing operation, the NID may determine that the enhanced transport protocol connection cannot be currently established. In some embodiments, the NID may attempt to probe the remote node again after a certain time interval or at regular time intervals to establish the enhanced transport protocol connection. In such cases, the NID may fall back to using the default transport protocol until the enhanced transport protocol connection is established (e.g., indicated by an action 412). In some instances, after one or more attempts to establish or re-establish the enhanced transport protocol connection in the probing state 404, the NID may determine that the enhanced transport protocol connection to the destination address has been unresponsive (e.g., not responding to the handshaking process) for a certain unresponsive timeout period T2, and the state machine 400 may transition to a phased-out state 408 (e.g., indicated by an action 414). The unresponsive timeout period T2 of action 410 can be longer than the data timeout period T1 of action 420. In some implementations, the unresponsive timeout period T2 can be, for example, an order of magnitude longer than the data timeout period T1. In other implementations, the unresponsive timeout period T2 can be the same or different as the data timeout period T1.

In the phased-out state 408, the NID can fall back to the default transport protocol and select the default transport protocol to transmit the packets to the destination address (e.g., indicated by an action 424). The state machine 400 may wait for a predetermined elapsed time using a phased-out timer before transitioning back to the idle state 402 from the phased-out state 408 (e.g., indicated by an action 426). In various examples, the predetermined elapsed time can be programmed to balance the resources used for retries versus the benefits of the enhanced transport protocol connection once established (benefits of having enhanced transport protocol may outweigh the multiple tries). In some embodiments, closing the enhanced transport protocol connection for a destination address may include removing the destination address from the address table so that this destination address can be treated as a new destination in the future, and the steps to establish a new connection can be performed again.

Figure 5:
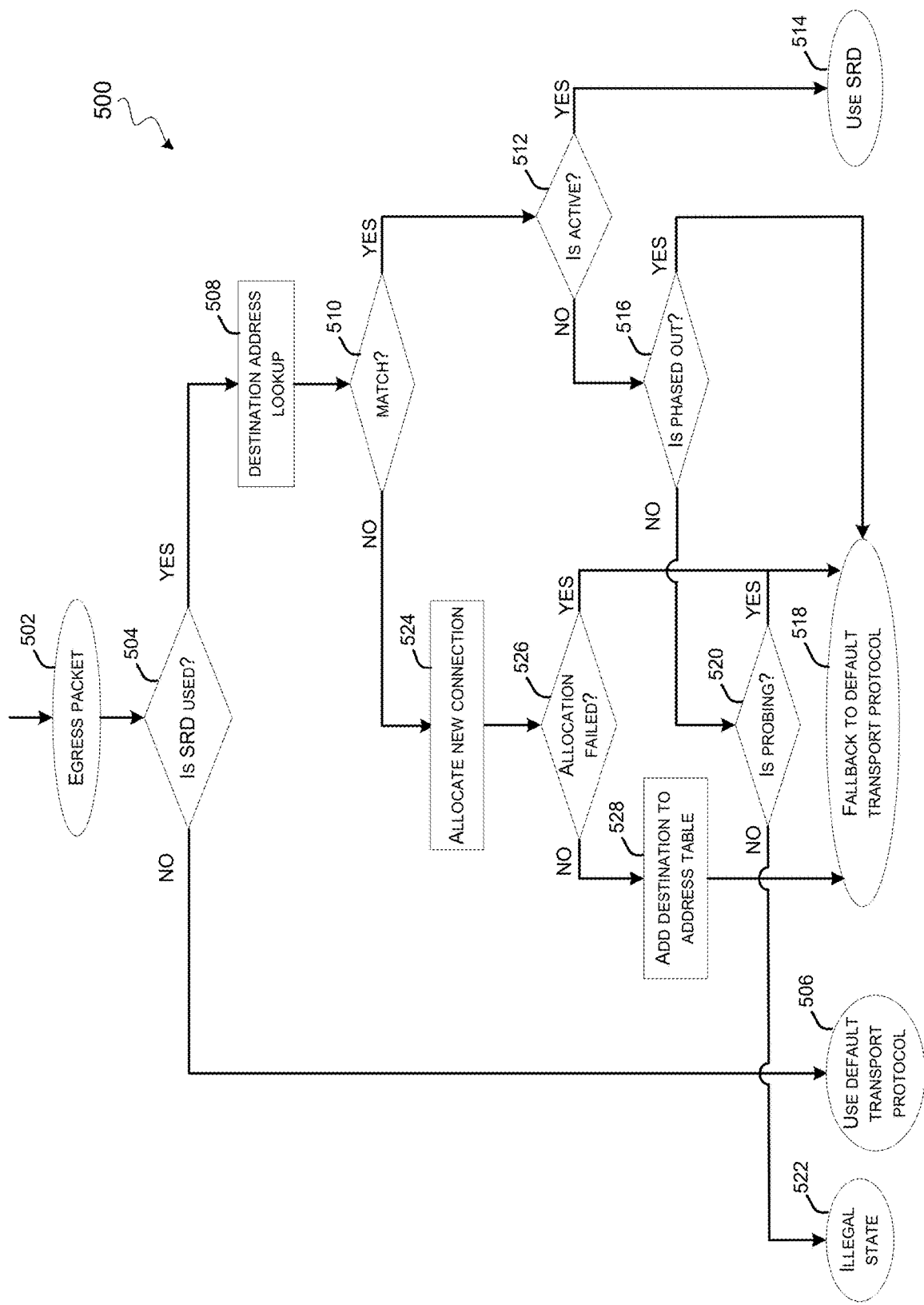
FIG. 5 illustrates a process flow for a method that can be executed by a network interface device (NID) to select different transport protocols for transmitting packets without losing connectivity, according to some embodiments.

FIG. 5 illustrates a process flow 500 for a method that can be executed by an NID to select different transport protocols for transmitting packets without losing connectivity, according to some embodiments. The NID can be the NID 212 when the host device 202 is operable as a source computing device and the host device 222 is operable as a destination computing device, or the NID can be the NID 232 when the host device 222 is operable as a source computing device and the host device 202 is operable as a destination computing device.

In step 502, the NID may receive an egress packet. For example, the egress packet may include data received from the application 208, which has been formatted into the first network packet 302 according to the first transport protocol.

In step 504, the NID may determine whether an enhanced transport protocol (e.g., the SRD protocol) is being used for the destination address. The decision to use the enhanced transport protocol may depend on several factors such as whether the enhanced transport protocol has been enabled for the given application, or the enhanced transport protocol is supported by the destination computing device, among others. Some host devices may not support the enhanced transport protocol, and therefore, cannot participate in establishing the enhanced transport connection.

In step 506, if the enhanced transport protocol is not being used, the NID may transmit the egress packet using the default transport protocol. For example, the NID may transmit the first network packet 302 using the first transport protocol, e.g., TCP or UDP.

In step 508, if the enhanced transport protocol is being used, the NID may determine whether the destination address is using the SRD for the first time based on the address table. The address table may include network connectivity state entries for different destination addresses that the source device has communicated with in the past, and the states of the corresponding enhanced transport protocol connections for each of those destination addresses. For example, at different points in time, some destination addresses may be in the active state, some may be in the probing state, and some may be in the phased-out state.

In step 510, the NID may determine whether there is a match on the destination address in the address table. If there is a match, it may indicate that the enhanced transport protocol connection has been used for the given destination address, and no match may indicate that the SRD connection has not been used for the given destination address.

In step 512, if there is a match on the address, the NID may determine whether the state of the enhanced transport protocol connection for this destination address is in an active state. If the state of the enhanced transport protocol connection is not in the active state, it may indicate that the SRD connection was active previously; however, the enhanced transport protocol connection is not currently active and cannot be used for transmitting the packet using the enhanced transport protocol. For example, the enhanced transport protocol connection may have been lost, the destination application may have disabled the enhanced transport protocol connection for some reason, or the remote node may be unavailable or disconnected.

In step 514, if the state of the enhanced transport protocol connection is in the active state, the NID can transmit the first packet to the destination address using the enhanced transport protocol connection. For example, the NID can encapsulate the first packet (e.g., TCP or UDP packet) according to the second transport protocol (e.g., enhanced transport protocol such as SRD) to generate the second network packet 300 for transmitting over the enhanced transport protocol connection.

In step 516, if the state of the enhanced transport protocol connection is not in the active state, the NID may determine whether the enhanced transport protocol connection with the destination address has phased out. The enhanced transport protocol connection having phased out may indicate that the destination address had supported the enhanced transport protocol connection in the past; however, the enhanced transport protocol connection is not currently available. In some cases, the source device may attempt to re-establish the enhanced transport protocol connection again with the destination address prior to concluding that the enhanced transport protocol connection with this destination address has phased out and cannot be used in the near future, if not permanently.

In step 518, if the state of the enhanced transport protocol connection is in the phased-out state, the NID may fall back to using the default transport protocol for transmitting the first packet to the destination address. For example, the NID may transmit the first network packet 302 using the first transport protocol, e.g., TCP or UDP, without encapsulating the first network packet in a second transport protocol header. In some implementations, if the encapsulation has been performed already to generate the second network packet 300, the encapsulation can be undone to recover the first network packet 302 for transmitting it to the destination address according to the first transport protocol.

In step 520, if the state of the enhanced transport protocol connection is not in the phased-out state, the state of the enhanced transport protocol connection can be in the probing state attempting to re-establish the enhanced transport protocol connection. The probing may include attempting a handshaking process with the destination computing device to re-establish the enhanced transport protocol connection for transmitting packets to the destination address. During the probing process, the NID may fall back to using the default transport protocol as described with reference to the step 518.

In step 522, if the state of the enhanced transport protocol connection is not in the probing state, it may indicate an illegal state or an unexpected error has occurred.

In step 524, if the destination address is not found in the address table, the NID may determine that there is no enhanced transport protocol connection established for the given destination address, and attempts to establish a new enhanced transport protocol connection. In some cases, if the address table is full, an existing enhanced transport protocol connection for another destination address can be evicted from the address table and reused for the given destination address.

In step 526, the NID may determine whether the allocation of the new connection was successful. If the allocation of the new connection has failed, it may imply that no resources were available, and the NID may fall back to using the default transport protocol.

In step 528, if the allocation of the new connection was successful, the NID may add the destination address to the address table. Adding the destination address to the address table may allow use of the enhanced transport protocol connection for any future packets that are targeted to this destination address. However, for the current packet, the default transport protocol can be used in the step 518. Note that FIG. 5 shows SRD as an example of the enhanced transport protocol, however, it will be understood that any enhanced transport protocol can be used without deviating from the scope of the disclosure.

Figure 6:
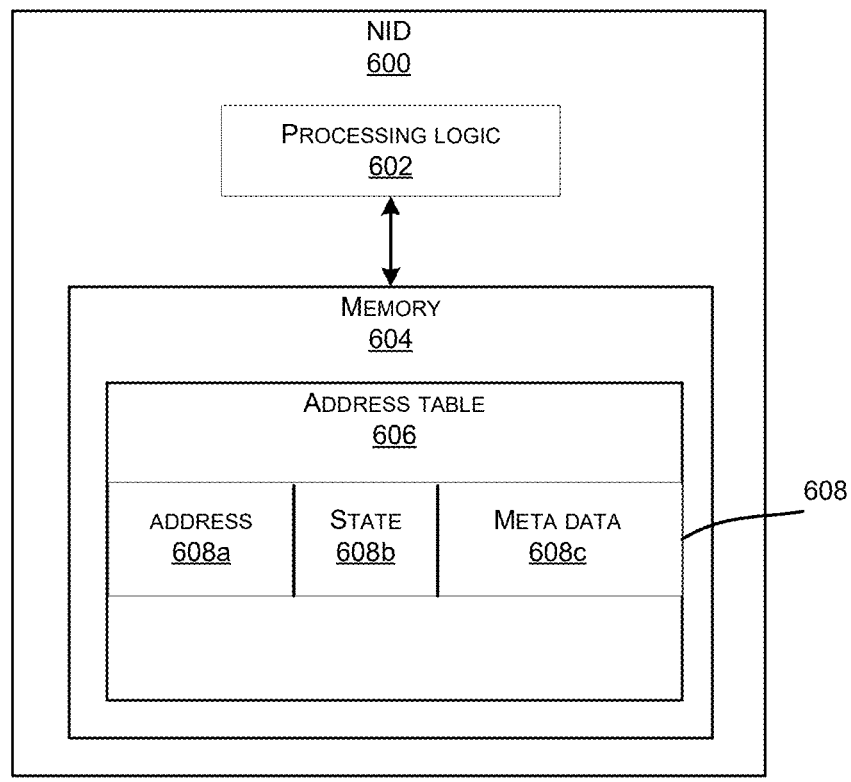
FIG. 6 illustrates a high-level block diagram of an NID that can select between different transport protocols for transmission of packets, according to some embodiments.

FIG. 6 illustrates a high-level block diagram of an NID 600 that can select between different transport protocols for transmission of packets, according to some embodiments. The NID 600 can be an example of the NID 212 and the NID 232 in FIG. 2.

The NID 600 may include processing logic 602 coupled to a memory 604. Note that the NID 600 may include other or different components which are not shown here for the ease of discussion. For example, the NID 600 may include ports (e.g., the source port 220 or the destination port 240) to communicate with other devices on the switch fabric 250. The processing logic 602 may include a processor (e.g., the processor 216 or the processor 236), a second transport protocol module (e.g., the second transport protocol module 218 or the second transport protocol module 238), and any other circuitry to support the functionality of a network interface adapter, e.g., a Media Access Control (MAC) circuit, a direct memory access (DMA) engine, etc.

The memory 604 may be similar to the memory 214 or the memory 234. The memory 604 can include an SRAM, a DRAM, or another type of RAM. The memory 604 may be configured to store an address table 606 and any other data associated with the operation of the NID 600. The address table 606 can be used to determine the state of the enhanced transport protocol connection to a destination address, when the NID 600 is operable as a source NID.

The address table 606 may be configured to store network connectivity state entries for the destination addresses that the NID 600 can communicate with. Each network connectivity state entry may include an address, a state of an enhanced transport protocol network connection to the address, and any other information associated with the enhanced transport protocol network connection. As an example, a network connectivity state entry 608 may include an address 608a, a state 608b, and metadata 608c. For example, the address 608a may correspond to a destination address associated with the destination NID 232. The state 608*b* may represent a state of the enhanced transport protocol connection to the address 608*a*. As discussed with reference to FIG. 4, in some implementations, the state 608*b* may represent the idle state 402, the probing state 404, the active state 406, or the phased-out state 408 of the enhanced transport protocol connection. The metadata 608*c* may include parameters associated with the enhanced transport protocol connection to the address 608*a*, e.g., a port number, number of flowlets, flow identifier, etc. In some implementations, the metadata 608*c* may include a pointer to the parameters associated with the SRD connection.

The processing logic 602 may be configured to obtain network packets for transmission to a destination address. The processing logic 602 may obtain a set of network packets from the first transport protocol module 210 that are formatted according to a default transport protocol for transmission to a destination address. For example, each network packet in the set of network packets may be formatted according to a first transport protocol (e.g., TCP or UDP). The processing logic 602 may be further configured to select between using the default transport protocol (e.g., TCP or UDP) and the enhanced transport protocol to transmit the set of network packets based on a state of a connection to the destination address for the enhanced transport protocol. The processing logic 602 may be configured to determine the state of the enhanced transport protocol network connection to the destination address by looking up the destination address in the address table 606.

In some embodiments, the enhanced transport protocol can be the SRD protocol, and the processing logic 602 may select between using the first transport protocol (e.g., TCP or UDP) and the SRD transport protocol based on the state of the SRD connection to the destination address for the SRD transport protocol. For example, the processing logic 602 may determine the state 608*b* of the SRD connection by looking up the address 608*a* in the address table 606. The state 608*b* of the SRD connection to the destination address can be updated in the address table 606 based on the state machine 400. As discussed with reference to FIG. 4, when the state machine 400 is in the active state 406 for a given destination address, the processing logic 602 may update the state 608*b* of the SRD connection to that destination address to the active state in the address table 606.

The processing logic 602 may be further configured to select the SRD transport protocol when the state of the SRD connection to a given destination address is in the active state. As discussed with reference to FIGS. 2 and 3, the processing logic 602 may encapsulate each network packet of the set of network packets to generate a set of encapsulated network packets according to the SRD transport protocol. The processing logic 602 may be further configured to transmit the set of encapsulated network packets in accordance with the SRD transport protocol to the destination address.

The processing logic 602 may be further configured to select the default transport protocol when the state of the SRD connection to a given destination address is not in the active state. For example, the state of the SRD connection may be the probing state, the phased-out state, or the closed state. In this case, when the processing logic obtains another set of network packets that are formatted according to the first transport protocol for transmission to the destination address, the processing logic 602 may transmit the other set of network packets in accordance with the first transport protocol to the destination address.

In some instances, the processing logic 602 may obtain a network packet for a destination address that is not found in the address table 606. In such cases, the processing logic 602 may be configured to determine whether the new destination address supports the SRD transport protocol. If the new destination address supports the SRD transport protocol, the processing logic 602 may add a new network connectivity state entry in the address table 606 for the new destination address, and set the state of the connection to the new destination address to a probing state. During the probing state, the processing logic 602 may transmit the network packet for the new destination address using the first transport protocol. In some examples, when the SRD connection to the destination address is closed, the processing logic 602 may remove the network connectivity state entry associated with the destination address from the address table 606.

Figure 7:
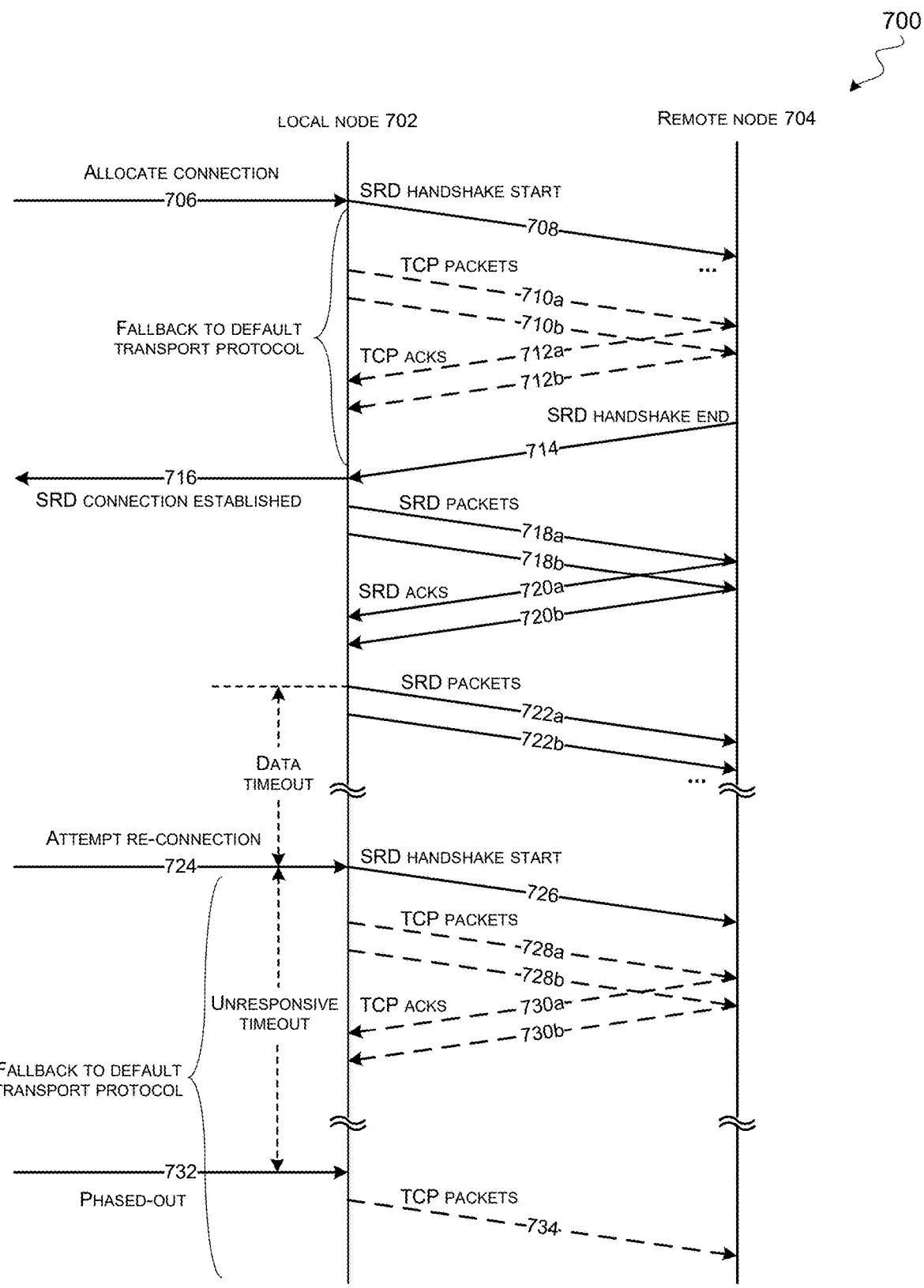
FIG. 7 illustrates an example communication flow, according to some embodiments.

FIG. 7 illustrates an example communication flow 700 between a local node 702 and a remote node 704, according to some embodiments. Local node 702 is operable to transmit packets to remote node 704. As an example, local node 702 can be any one of the nodes 102*a*-102*h* in FIG. 1, and remote node 704 can be another one of the nodes 102*a*-102*h*. In some implementations, local node 702 can be the host computing device 202, and remote node 704 can be the host computing device 222.

Communication flow 700 may begin with local node 702 establishing an enhanced transport protocol (e.g., SRD) connection with remote node 704. For example, local node 702 may receive a request from an application to transmit a packet to remote node 704. Local node 702 may allocate the connection 706 by adding an entry containing the destination address of remote node 704 in an address table. Local node 702 may initiate an enhance transport protocol handshake with the remote node 704. For instance, local node 702 may send a SRD handshake start packet 708 to remote node 704, and transition the connection into a probing state 404. While in probing state 404, local node 702 may fallback to using a default transport protocol (e.g., TCP) to transmit data packets to remote node 704. For instance, local node 702 may send TCP packets 710*a* and 710*b* to remote node 704, and remote node 704 may send back TCP acknowledgements 712*a* and 712*b* for respective TCP packets 701*a* and 710*b*.

Local node 702 may continue to communicate with remote node 704 using the default transport protocol until the SRD handshake completes. The handshake process can be completed when a SRD handshake end packet 714 is received from remote node 704. More generally, the handshake process to establish the enhance transport protocol connection may involve local node 702 sending one or more handshake packets to remote node 704, and remote node 704 replying with one or more handshake packets to local node 702.

As shown in FIG. 7, the enhanced transport protocol (e.g., SRD) connection is established at 716 upon completion of the handshake process. At this point, the connection can transition to an active state 406, and local node 702 can begin to transmit data packets using the enhanced transport protocol (e.g., SRD). For example, local node 702 may encapsulate TCP packets with corresponding SRD headers, and transmit SRD packets 718*a* and 718*b* to remote node 704. Remote node 704 may reply with SRD acknowledgements 720*a* and 720*b* for respective SRD packets 718*a* and 718*b*. Local node 702 may continue to transmit packets to remote node 704 using the enhance transport protocol while the connection is in the active state 406.

In some scenarios, the remote node 704 may stop responding to the SRD packets. For example, local node 702 may send SRD packets 722*a* and 722*b* to remote node 704, but may not receive any SRD acknowledgments for these packets. Although not shown, the same packets may be retransmitted over multiple attempts. After a data timeout period T1 of not receiving SRD acknowledgements from remote node 704, local node 702 may transition the connection back to probing state 404 and attempt reconnection at 724. Local node may send a SRD handshake start packet 726 to remote node 704 in an attempt to re-establish the enhanced transport protocol (e.g., SRD) connection. Local node 702 may automatically select the default transport protocol (e.g., TCP) to send packets to remote node 704 while the SRD connection is being re-established. For instance, local node 702 may send TCP packets 728*a* and 728*b* to remote node 704. Remote node 704 may respond with TCP acknowledgments 730*a* and 730*b* for the respective TCP packets 728*a* and 728*b*.

In some scenarios, if the enhanced transport protocol connection cannot be re-established after an unresponsive timeout period T2 (e.g., a predetermine time), local node 702 may phase out the connection at 732 and transition the connection to the phased-out state 408. The unresponsive timeout period T2 can be greater (longer in duration) than the data timeout period T1. While in the phased-out state 408, local node 702 may automatically select the default transport protocol, and send packets to remote node 704 using the default transport protocol. For example, local node 702 may send TCP packet 734 to remote node 704. After a phased-out time has expired, the SRD connection can be closed. Local node 702 may continue to communicate with remote node 704 using the default transport protocol until a new enhanced transport protocol connection can be established.

Figure 8:
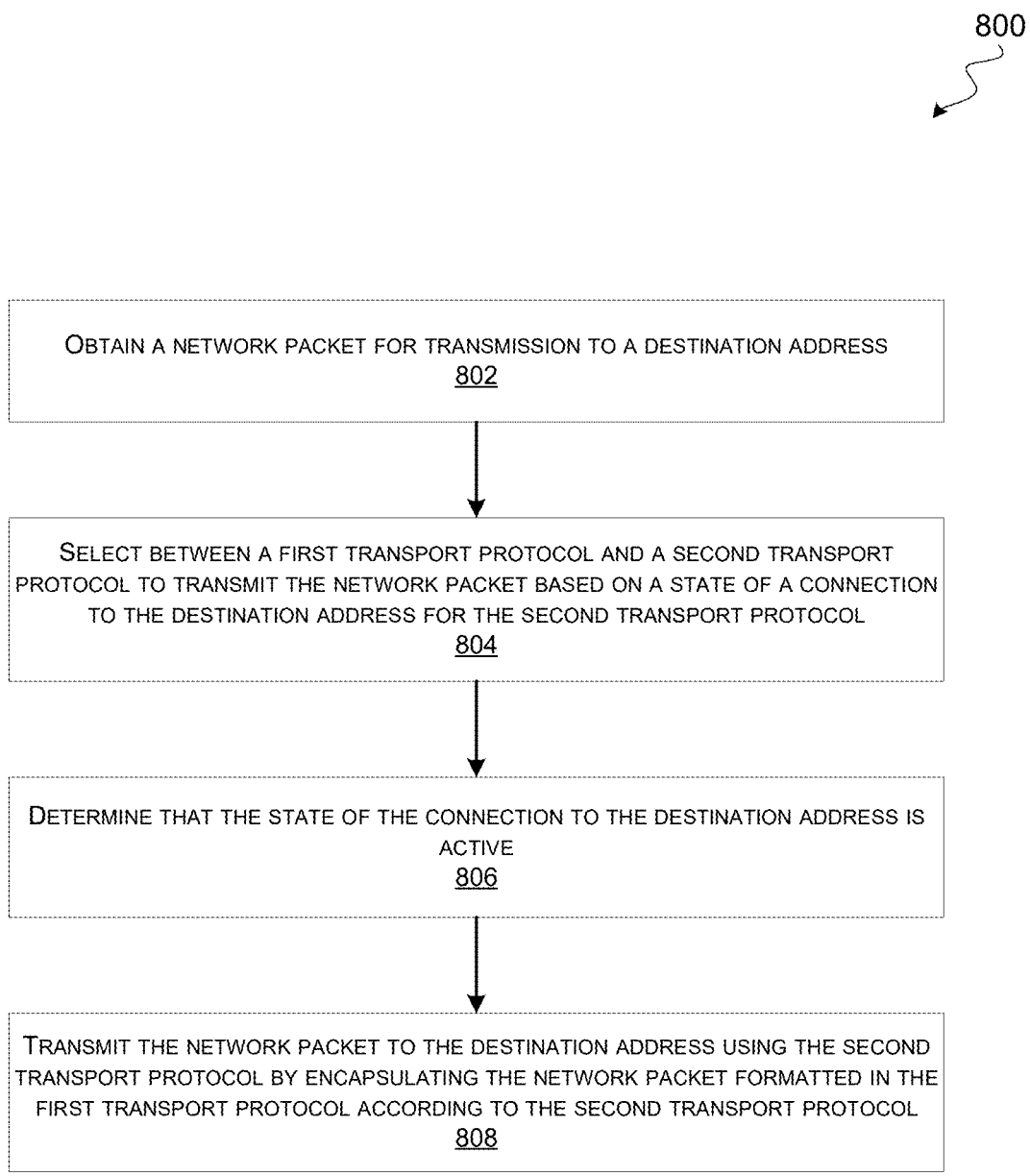
FIG. 8 illustrates a flow chart for an example method executed by an NID to automatically select different transport protocols, according to some embodiments.

FIG. 8 illustrates a flowchart 800 for a method executed by an NID to automatically select between different transport protocols for transmitting packets, according to some embodiments. As an example, the NID can be the NID 212, NID 232, or the NID 600.

In step 802, the method includes obtaining a network packet for transmission to a destination address. The processing logic 602 in the NID may obtain a network packet from the first transport protocol module 210 that is formatted according to a default transport protocol (e.g., the first transport protocol such as TCP or UDP). For example, the first network packet can be similar to the first network packet 302.

In step 804, the method includes selecting between: (1) using a first transport protocol; and (2) encapsulating the network packet formatted in the first transport protocol in accordance with a second transport protocol, to transmit the network packet based on a state of a connection to the destination address for the second transport protocol. The processing logic 602 may select between using the first transport protocol and an enhanced transport protocol such as the SRD transport protocol to transmit the network packet based on the state of the SRD connection to the destination address for the SRD transport protocol. For example, the state of the SRD connection to the destination address can be determined by looking up the corresponding address 608*a* in the address table 606 that is storing the network connectivity state entries.

In step 806, the method includes determining that the state of the connection to the destination address is active. The processing logic 602 may determine that the state of the connection to the destination address is active based on the state 608*b* corresponding to the address 608*a* in the address table 606. The state of the SRD connection is active when the state machine 400 of the NID is in the active state 406.

In step 808, the method includes transmitting the network packet to the destination address using the second transport protocol by encapsulating the network packet formatted in the first transport protocol according to the second transport protocol. The processing logic 602 may encapsulate the network packet to generate an encapsulated network packet according to the SRD transport protocol and transmit the encapsulated network packet to the destination address using the SRD transport protocol. For example, the encapsulated network packet can be similar to the second network packet 300.

In some instances, the state of the SRD connection may transition from the active state 406 to the probing state 404 upon determining that the SRD connection is not responding to SRD data packets over a certain timeout period T1, as described with reference to the action 420 in FIG. 4. In the probing state 404, additional network packets obtained by the processing logic 602 for transmission to the destination address can be transmitted to the destination address using the first transport protocol (e.g., default transport protocol) while the state of the connection is in the probing state 404, as described with reference to the action 412 in FIG. 4. In some instances, the state of the connection may transition from the probing state 404 back to the active state 406 upon determining that the connection is re-established during a certain timeout period T2, as described with reference to the action 416 in FIG. 4.

In some instances, the state of the connection may transition from the probing state 404 to the phased-out state 408 upon determining that the connection is unresponsive over a certain timeout period T2, as described with reference to the action 414 in FIG. 4. In some cases, the connection may be closed after being in the phased-out state 408 for a predetermined elapsed time, as described with reference to the action 426 in FIG. 4.

Thus, the techniques described herein can be used to improve the network reliability and performance by maintaining network connectivity by falling back to using the default transport protocol when the enhanced (e.g., SRD) transport protocol cannot be used for transmitting the packets. The transition between the transport protocols can be automatically performed by the NID based on the state of the enhanced transport protocol connection, without the applications executing on the source computing device or the destination computing device being aware of the transition.

Figure 9:
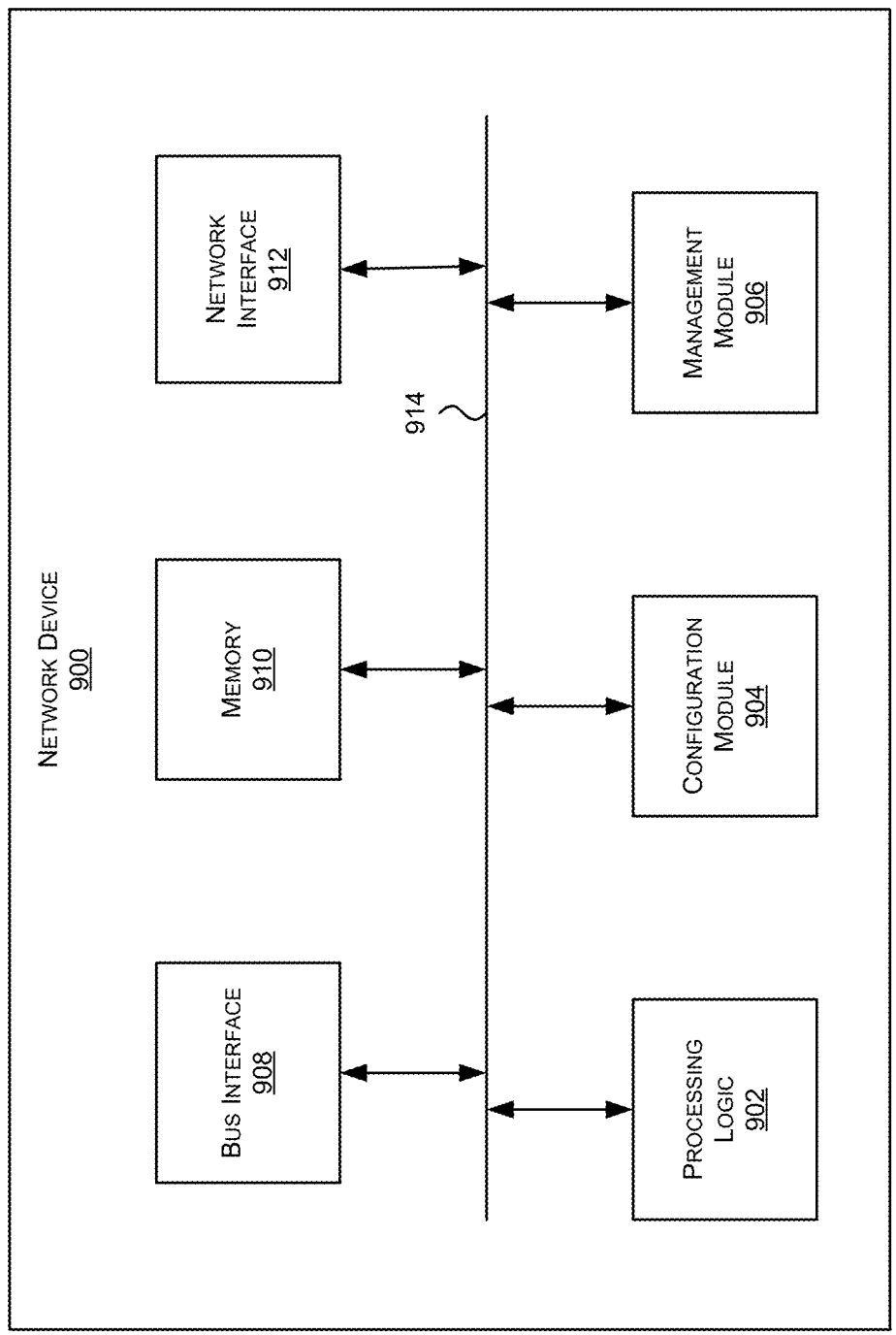
FIG. 9 illustrates an example of a network device, according to certain aspects of the disclosure.

FIG. 9 illustrates an example of a network device 900. Functionality and/or several components of the network device 900 may be used without limitation with other embodiments disclosed elsewhere in this disclosure, without limitations. For example, the network device can be an example of the NID 212 and/or the NID 232. A network device 900 may facilitate processing of packets and/or forwarding of packets from the network device 900 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 900 may be the recipient and/or generator of packets. In some implementations, the network device 900 may modify the contents of the packet before forwarding the packet to another device. The network device 900 may be a peripheral device coupled to another computer device, a switch, a router or any other suitable device enabled for receiving and forwarding packets.

In one example, the network device 900 may include processing logic 902, a configuration module 904, a management module 906, a bus interface module 908, memory 910, and a network interface module 912. These modules may be hardware modules, software modules, or a combination of hardware and software. In certain instances, modules may be interchangeably used with components or engines, without deviating from the scope of the disclosure. The network device 900 may include additional modules, which are not illustrated here. In some implementations, the network device 900 may include fewer modules. In some implementations, one or more of the modules may be combined into one module. One or more of the modules may be in communication with each other over a communication channel 914. The communication channel 914 may include one or more busses, meshes, matrices, fabrics, a combination of these communication channels, or some other suitable communication channel.

The processing logic 902 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 902 may include processors developed by ARM®, MIPS®, AMID®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 902 may be stored on a computer-readable storage medium, for example, in the form of a computer program. The computer-readable storage medium may be non-transitory. In some cases, the computer-readable medium may be part of the memory 910.

The memory 910 may include either volatile or non-volatile, or both volatile and non-volatile types of memory. The memory 910 may, for example, include random access memory (RAM), read only memory (ROM), Electrically Erasable Programmable Read-Only Memory (EEPROM), flash memory, and/or some other suitable storage media. In some cases, some or all of the memory 910 may be internal to the network device 900, while in other cases some or all of the memory may be external to the network device 900. The memory 910 may store an operating system comprising executable instructions that, when executed by the processing logic 902, provides the execution environment for executing instructions providing networking functionality for the network device 900. The memory may also store and maintain several data structures and routing tables for facilitating the functionality of the network device 900.

In some implementations, the configuration module 904 may include one or more configuration registers. Configuration registers may control the operations of the network device 900. In some implementations, one or more bits in the configuration register can represent certain capabilities of the network device 900. Configuration registers may be programmed by instructions executing in the processing logic 902, and/or by an external entity, such as a host device, an operating system executing on a host device, and/or a remote device. The configuration module 904 may further include hardware and/or software that control the operations of the network device 900.

In some implementations, the management module 906 may be configured to manage different components of the network device 900. In some cases, the management module 906 may configure one or more bits in one or more configuration registers at power up, to enable or disable certain capabilities of the network device 900. In certain implementations, the management module 906 may use processing resources from the processing logic 902. In other implementations, the management module 906 may have processing logic similar to the processing logic 902, but segmented away or implemented on a different power plane than the processing logic 902.

The bus interface module 908 may enable communication with external entities, such as a host device and/or other components in a computing system, over an external communication medium. The bus interface module 908 may include a physical interface for connecting to a cable, socket, port, or other connection to the external communication medium. The bus interface module 908 may further include hardware and/or software to manage incoming and outgoing transactions. The bus interface module 908 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 908 may include the physical layer for any of these bus protocols, including a connector, power management, and error handling, among other things. In some implementations, the network device 900 may include multiple bus interface modules for communicating with multiple external entities. These multiple bus interface modules may implement the same local bus protocol, different local bus protocols, or a combination of the same and different bus protocols.

The network interface module 912 may include hardware and/or software for communicating with a network. This network interface module 912 may, for example, include physical connectors or physical ports for wired connection to a network, and/or antennas for wireless communication to a network. The network interface module 912 may further include hardware and/or software configured to implement a network protocol stack. The network interface module 912 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 900 may include multiple network interface modules, each configured to communicate with a different network. For example, in these implementations, the network device 900 may include a network interface module for communicating with a wired Ethernet network, a wireless 802.11 network, a cellular network, an Infiniband network, etc.

The various components and modules of the network device 900, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 10, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A network interface device comprising:
   a memory storing an address table containing network connectivity state entries, each network connectivity state entry having an address and a state of an enhanced transport protocol network connection to the address; and
   processing logic configured to:
      obtain a first set of network packets formatted according to a default transport protocol for transmission to a destination address;
      determine that the state of the enhanced transport protocol network connection to the destination address is in an active state by looking up the destination address in the address table;
      encapsulate each network packet of the first set of network packets to generate a set of encapsulated network packets according to the enhanced transport protocol;
      transmit the set of encapsulated network packets in accordance with the enhanced transport protocol to the destination address;
      determine that the enhanced transport protocol network connection to the destination address is unresponsive;
      update the state of the enhanced transport protocol network connection to the destination address to a probing state;
      obtain a second set of network packets formatted according to the default transport protocol for transmission to the destination address;
      determine that the state of the enhanced transport protocol network connection to the destination address is not in an active state; and
      transmit the second set of network packets in accordance with the default transport protocol to the destination address.

2. The network interface device of claim 1, wherein the processing logic is further configured to:

determine that the enhanced transport protocol network connection to the destination address is reestablished; and update the state of the enhanced transport protocol network connection to the destination address back to the active state in the address table.

3. The network interface device of claim 1, wherein the processing logic is further configured to:

determine that the enhanced transport protocol network connection to the destination address cannot be established for an extended timeout duration;

update the state of the enhanced transport protocol network connection to the destination address to a phased-out state in the address table; and remove the enhanced transport protocol network connection to the destination address from the address table after a predetermined elapsed time in the phased-out state.

4. The network interface device of claim 1, wherein the default transport protocol is one of a Transmission Control Protocol (TCP) or a User Datagram Protocol (UDP), and the enhanced transport protocol is a Scalable Reliable Datagram (SRD) protocol.

5. A computer-implemented method, comprising:

obtaining a first network packet for transmission to a destination address;

determining that a state of a connection to the destination address is in an active state;

encapsulating the first network packet formatted in a first transport protocol in accordance with a second transport protocol to transmit the first network packet to the destination address;

obtaining a second network packet for transmission to the destination address;

determining that the state of the connection to the destination address has transitioned from the active state to a probing state; and transmitting the second network packet to the destination address using the first transport protocol without encapsulating the second network packet in the second transport protocol.

6. The computer-implemented method of claim 5, wherein the state of the connection transitions from the active state to the probing state upon determining that the connection is unresponsive over a data timeout period.

7. The computer-implemented method of claim 6, wherein the state of the connection transitions from the probing state back to the active state upon re-establishing the connection within a predetermined time period.

8. The computer-implemented method of claim 6, wherein the state of the connection transitions from the probing state to a phased-out state upon failing to establish the connection within a predetermined time period.

9. The computer-implemented method of claim 8, further comprising closing the connection after being in the phased-out state for a predetermined elapsed time.

10. The computer-implemented method of claim 8, wherein the predetermined time period is greater than the data timeout period.

11. The computer-implemented method of claim 5, wherein the state of the connection to the destination address is determined by looking up the destination address in an address table that stores network connectivity state entries, and wherein each network connectivity state entry includes an address and a state of a connection to the address for the second transport protocol.

12. The computer-implemented method of claim 11, further comprising:

obtaining a network packet for a new destination address that is not in the address table;

determining that the new destination address supports the second transport protocol;

adding a new network connectivity state entry in the address table for the new destination address;

setting a state of a connection to the new destination address to a probing state; and transmitting the network packet for the new destination address using the first transport protocol.

13. The computer-implemented method of claim 11, further comprising:

removing the network connectivity state entry associated with the destination address upon closing the connection to the destination address.

14. The computer-implemented method of claim 5, wherein the first transport protocol is one of a Transmission Control Protocol (TCP) or a User Datagram Protocol (UDP), and the second transport protocol is a Scalable Reliable Datagram (SRD) protocol.

15. A network interface device comprising:

an address table; and processing logic configured to:

obtain a first network packet for transmission to a destination address;

determine that a state of a connection to the destination address is in an active state by looking up the destination address in the address table;

encapsulate the first network packet formatted in a first transport protocol in accordance with a second transport protocol to transmit the first network packet to the destination address;

obtain a second network packet for transmission to the destination address;

determine that the state of the connection to the destination address is in a probing state by looking up the destination address in the address table; and transmit the second network packet to the destination address using the first transpor protocol in accordance with without encapsulating the second network packet in the second transport protocol.

16. The network interface device of claim 15, wherein the state of the connection transitions from the active state to the probing state upon determining that the connection is unresponsive over a first timeout period.

17. The network interface device of claim 16, wherein the state of the connection transitions from the probing state back to the active state upon determining that the connection is re-established during a second timeout period.

18. The network interface device of claim 16, wherein the state of the connection transitions from the probing state to a phased-out state upon determining that the connection is unresponsive over a second timeout period.

19. The network interface device of claim 18, wherein the second timeout period is greater than the first timeout period.

20. The network interface device of claim 18, wherein the first transport protocol is used in the phased-out state to transmit network packets to the destination address.

* * * * *